(12) United States Patent
Melzer

(10) Patent No.: US 9,444,804 B2
(45) Date of Patent: Sep. 13, 2016

(54) DYNAMIC SECURITY QUESTION GENERATION

(71) Applicant: Roy S. Melzer, Tel-Aviv (IL)

(72) Inventor: Roy S. Melzer, Tel-Aviv (IL)

( * ) Notice: Subject to any disclaimer, the term of this patent is extended or adjusted under 35 U.S.C. 154(b) by 59 days.

(21) Appl. No.: 14/457,148

(22) Filed: Aug. 12, 2014

(65) Prior Publication Data

US 2015/0150104 A1     May 28, 2015

Related U.S. Application Data

(60) Provisional application No. 61/908,207, filed on Nov. 25, 2013.

(51) Int. Cl.
    *G06F 21/45*      (2013.01)
    *H04L 29/06*      (2006.01)
    *G06F 21/31*      (2013.01)

(52) U.S. Cl.
CPC ............. *H04L 63/08* (2013.01); *G06F 21/316* (2013.01); *G06F 21/45* (2013.01); *G06F 2221/2101* (2013.01); *G06F 2221/2111* (2013.01); *H04L 63/107* (2013.01); *H04L 63/1425* (2013.01)

(58) Field of Classification Search
CPC ................. G06F 21/45; G06F 21/316; G06F 17/30569; G06F 21/40; G06F 2221/2111; G06F 2221/2101; H04L 63/08; H04L 9/3271; H04L 9/3226; H04L 63/205; H04L 2209/56; H04L 63/107; H04L 63/1425
See application file for complete search history.

(56) References Cited

U.S. PATENT DOCUMENTS

| | | | | |
|---|---|---|---|---|
| 8,578,468 | B1* | 11/2013 | Yadav ..................... | H04L 63/08 713/154 |
| 8,613,089 | B1* | 12/2013 | Holloway et al. .............. | 726/23 |
| 2006/0224898 | A1* | 10/2006 | Ahmed ......................... | 713/186 |
| 2008/0066165 | A1* | 3/2008 | Rosenoer ......................... | 726/5 |
| 2010/0211996 | A1* | 8/2010 | McGeehan et al. .............. | 726/4 |
| 2010/0328035 | A1* | 12/2010 | Hanley et al. ............... | 340/5.84 |
| 2011/0066383 | A1* | 3/2011 | Jangle et al. .................... | 702/19 |
| 2011/0179469 | A1* | 7/2011 | Blinn et al. ........................ | 726/4 |
| 2013/0024202 | A1* | 1/2013 | Harris et al. .................... | 705/1.1 |
| 2013/0073853 | A1* | 3/2013 | Ford ................... | H04L 63/1466 713/168 |
| 2013/0204694 | A1* | 8/2013 | Banister et al. ........... | 705/14.41 |
| 2013/0247187 | A1* | 9/2013 | Hsiao .................... | G06F 21/552 726/22 |
| 2013/0254857 | A1* | 9/2013 | Bajenov et al. .................. | 726/7 |
| 2014/0053265 | A1* | 2/2014 | Crowley .......................... | 726/22 |

* cited by examiner

*Primary Examiner* — Don Zhao

(57) ABSTRACT

A method of dynamically generating a security question for accessing a resource. The method comprises monitoring a behavior of said user during a monitoring period to identify automatically a deviation from a behavioral pattern indicative of repetitive behavior of a user, automatically generating a security question responded to by an indication of said deviation, receiving a user input inputted by a user in response to a presentation of said security question and said deviation, and authenticating, after said monitoring period, an access to a resource according to a match between said user input and said deviation.

16 Claims, 2 Drawing Sheets

DYNAMIC SECURITY QUESTION GENERATION

RELATED APPLICATION

This application claims the benefit of priority under 35 USC 119(e) of U.S. Provisional Patent Application No. 61/908,207 filed Nov. 25, 2013, the contents of which are incorporated herein by reference in their entirety.

BACKGROUND

The present invention, in some embodiments thereof, relates to security and, more specifically, but not exclusively, to methods and systems of automatically generating security questions.

Many conventional activities of a user are now performed over the Internet. Internet users use the Internet to conduct daily activities such as shopping, navigating, banking, and social activities. For reasons of security and confidentiality, when using a web service, a user is often required by the website to set up a secured user account, usually password-protected.

However, passwords may be forgotten by users as more resources require them. Moreover, managing a plurality of password poses a risk a user losing one of his passwords. This is because the lost password may be used to access different resources.

When a password is lost, a user may require to answer security question(s) or challenges with answer(s) she manually inputted when opening or setting an account. For example, the user may need to input his mother's maiden name, the name of his childhood pet, or the name of the high school he graduated from. Such information is then stored in the user's profile. When the user requests password resetting, the resource, for example a website, asks the user the same set of questions.

SUMMARY

According to an aspect of some embodiments of the present invention there is provided a method of dynamically generating a security question for accessing a resource. The method comprises monitoring a behavior of a user during a monitoring period to identify automatically a deviation from a behavioral pattern indicative of repetitive behavior of the user, automatically generating a security question responded to by an indication of the deviation, receiving a user input in response to a presentation of the security question, and authenticating an access to a resource when the user input includes an indication of the deviation.

Optionally, the monitoring comprises recoding the behavior during a pre monitoring period of at least one day and calculating the behavioral pattern from a classification of the behavior during the pre monitoring period.

More optionally, the recorded behavior is used as a training set for creating a classifier, the deviation is identified using the classifier.

Optionally, the method further comprises associating between the resource and the security question after the monitoring period; wherein the authenticating comprises selecting the security question according to the association.

Optionally, the behavioral pattern is calculated by gathering locational data logging at least one of a route, a location and a movement of the user during a pre-monitoring period that precedes the monitoring period, the deviation is a deviation from at least one of the route, the location and the movement at a respective time at a respective time during the monitoring period.

Optionally, the behavioral pattern is calculated by gathering browsing data documenting access of the user to a set of a plurality of web documents during a pre-monitoring period that precedes the monitoring period, the deviation is at least one of an access to an additional web document that is not in the set at a respective time during the monitoring period and lack of access to at least one of the plurality of web documents at a respective time during the monitoring period.

Optionally, the behavioral pattern is calculated by gathering media content viewed by the user during a pre monitoring period, the deviation is at least one of viewing additional media content at a respective time during the monitoring period and not viewing a routinely viewed content at a respective time during the monitoring period.

Optionally, the behavioral pattern is an application usage pattern calculated by gathering application usage data a set of a plurality of application installed in a client terminal used by the user during a pre-monitoring period that precedes the monitoring period, the deviation is at least one of using an additional application that is not in the set at a respective time during the monitoring period and lack of usage of at least one of the plurality of applications at a respective time during the monitoring period.

Optionally, the behavioral pattern is a communication pattern calculated by gathering communication data documenting a set of a plurality of communication sessions held using a client terminal of the user during a pre-monitoring period that precedes the monitoring period, the deviation is at least one communicating with at least one new contact, not communicating with a routinely contacted contact during the monitoring period, and changing an average time or frequency of a routinely performed communication session during the monitoring period.

More optionally, the communication data comprises a call history indicative of calls made by or with the user during the pre-monitoring period.

More optionally, the communication data comprises a messaging history indicative of at least one instant messaging content and instant messaging participants made during the pre-monitoring period.

More optionally, the communication data comprises email history indicative of recipients or senders of emails sent or received during the pre monitoring period.

Optionally, the behavioral pattern is a communication pattern calculated by gathering email data documenting a set of a plurality of communication sessions held using a client terminal of the user during a pre-monitoring period that precedes the monitoring period, the deviation is detected by identifying content not documented in the plurality of communication sessions and viewed by the user using the client terminal.

Optionally, the monitoring period is at least 1 hour.

Optionally, the resource is a file and the security question is embedded into a security script loaded when an access to the file is requested.

Optionally, the resource is an application installed in a client terminal and the security question is presented when an access the application is requested.

According to an aspect of some embodiments of the present invention there is provided a system of dynamically generating a security question for accessing a resource. The system comprises a database which stores a behavioral pattern indicative of repetitive behavior of a use, a monitoring module which monitors a behavior of the user, as detected by a client terminal of the user during a monitoring period, to identify automatically a deviation from the behavioral pattern, a question generation module which generates automatically a security question responded to by an indication of the deviation, a user interface which generates a presentation of the security question and receives a user input in response to the presentation, and an authentication module which authenticate, after the monitoring period, an access to a resource when the user input includes an indication of the deviation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention.

In this regard, the description taken with the drawings makes apparent to those skilled in the art how embodiments of the invention may be practiced.

In the drawings:

Figure 1:
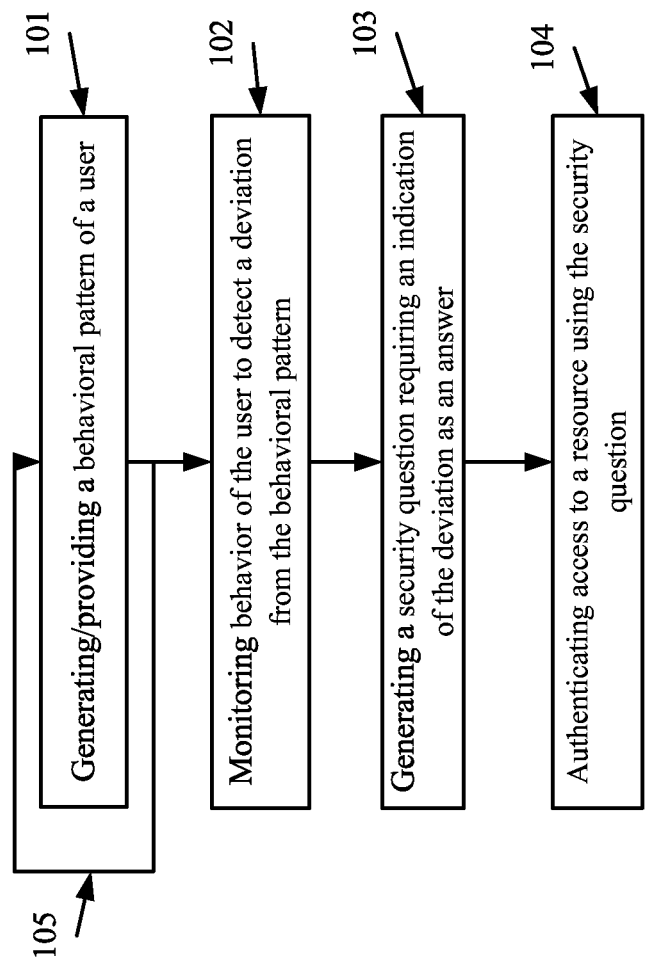
Figure 2:
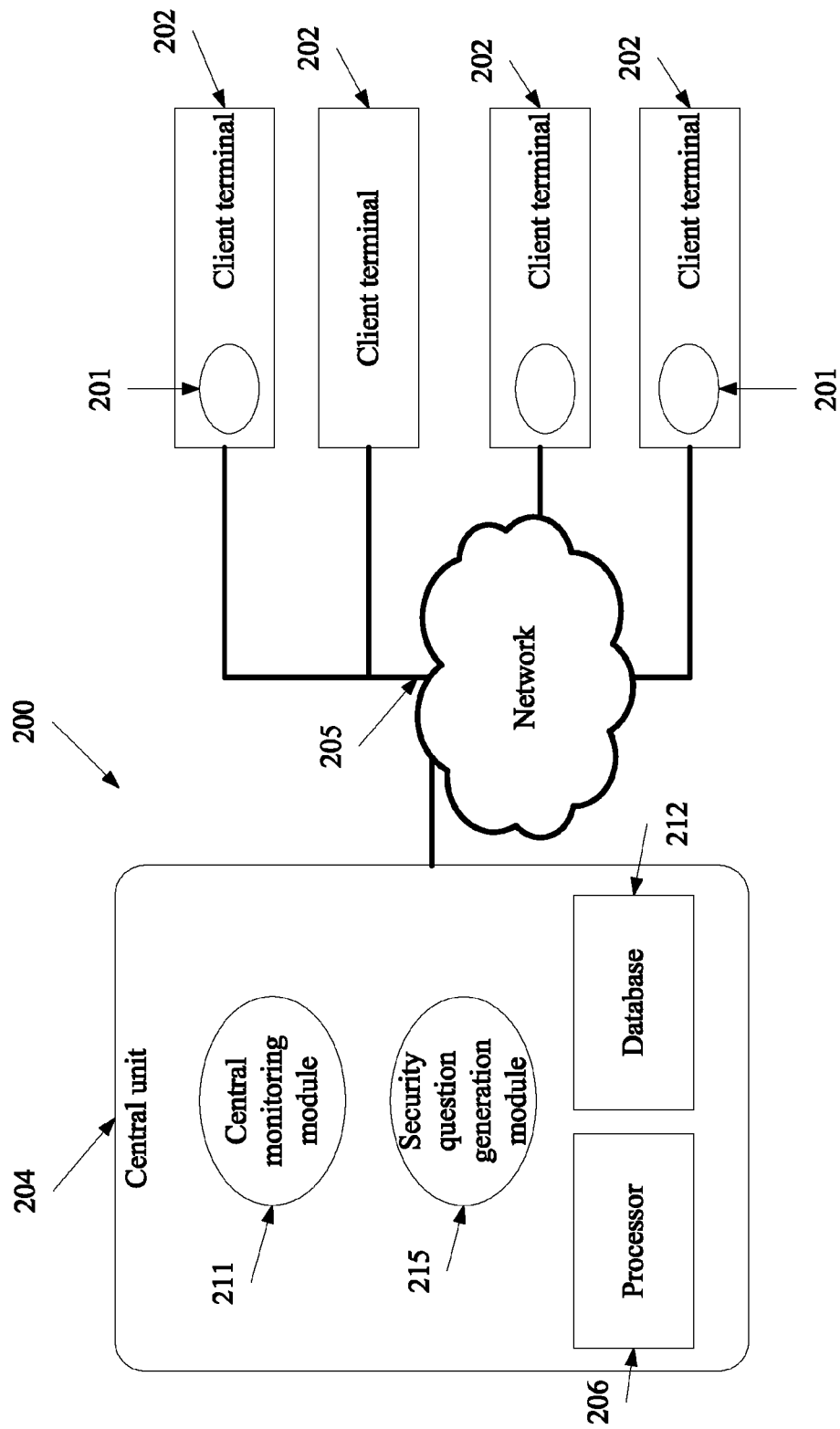

FIG. 1 is a flowchart of a method of dynamically generating security question(s) for authenticating access to resource(s) associated with a user based on one or more behavioral deviations of the user behavior from a repetitive behavioral pattern calculated, according to some embodiments of the present invention; and FIG. 2 is a schematic illustration of a system of dynamically generating security question(s) for authenticating access to resource(s), for instance by implementing the method depicted in FIG. 1, according to some embodiments of the present invention.

DETAILED DESCRIPTION

The present invention, in some embodiments thereof, relates to security and, more specifically, but not exclusively, to methods and systems of automatically generating security questions.

According to some embodiments of the present invention, there are provided methods and systems of dynamically generating security question(s) based on a deviation of a user behavior from routinely actions documented as performed in the past. The security question(s) may be used for authenticating access to a resource such as a file, application, a system, a webpage, a service and/or a device. The security question may be generated periodically to identify a deviation that is still remembered by the user, optionally based on her up to date routinely actions. The routinely actions may be documented as a behavioral pattern, for example a classifier or a model generated using statistical techniques.

For example, the behavioral pattern may be generated by monitoring a behavior of a user during a pre monitoring period, for example by monitoring data captured by the client device(s) of the user. This behavior may include locational data, browsing data, application usage data, media consumption data, communication data and/or the like. The deviation may be automatically detected by monitoring a behavior of a user during a monitoring period, for example of few hours and/or days and matching this behavior with the behavioral pattern. This allows automatically generating one or more security question(s), for brevity referred to as a security question, which is responded to by an indication of the deviation. For example, the indication may be a text describing the deviation or a semantic equivalent thereto, an option selected from a set of possible options (answers), a user input, such as a drawing or a gesture indicative of the deviation and/or the like. In use, an input provided by a user, for example manually, in response to a presentation of the security question is used to authenticate, after the monitoring period, an access to a resource.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart of a method 100 of dynamically generating security question(s) for authenticating access to resource(s) associated with a user based on one or more behavioral deviations of the user behavior from a repetitive behavioral pattern calculated, optionally statistically, based on the user's historical behavior, according to some embodiments of the present invention.

Optionally, the resource is content, for example a file, a metadata, a log and/or the like and/or a service, for example an application that is locally installed and/or accessed remotely.

The method 100 is optionally implemented using a module, such as an application installed in a handheld and/or wearable device of the user and/or a widget or an add-on that accesses a remote service. The handheld and/or wearable device, which may be, for example, a Smartphone, a smart glass, a tablet, a personal computer, a laptop, and/or the like and may be referred to herein, for brevity, as a client device. In use, this module, which may be installed in a client device of the user, monitors the behavior of the user to identify behavioral deviations from behavioral patterns calculated from recorded historical data, such as locational patterns, browsing patterns, communication patterns media capturing patterns and/or application usage patterns, for example as described below.

For example, reference is also made to FIG. 2 which is a schematic illustration of a system 200 of dynamically generating security question(s) for authenticating access to resource(s) associated with a user, for instance by implementing the method depicted in FIG. 1, according to some embodiments of the present invention. The system 200 includes a monitoring module 201 may be installed in each of a plurality of client devices 202 using the system 200 and/or a central monitoring module 211 that receive data from the client terminals 202. The client devices, which communicate a the central unit 204 of the system 200 via a network 205, may include Smartphones, laptops, desktops, tablets, wearable devices, such as Google Glasses and/or any content access enabling devices. The monitoring module 201 monitors behavior of a certain user for calculating behavioral patterns and/or deviation(s) from calculated behavioral patterns, for example as described below. The behavioral patterns and/or deviation(s) may be locally calculated and/or stored, for instance in memory of the client device 202 and/or remotely calculated and/or stored, for instance using a database 212 of at a central unit 204, such as a server that the monitoring module 201 communicate with. The system 200 further includes a security question generation module 215 that generates security question(s) for instance as described below. The security question generation module 215 may be installed in the central unit 204 or in the client terminal 201 (not shown). The modules are executed using the processor 206 and implemented as application(s), sub-application(s) and/or as a firmware. Actions performed by the above mentioned modules are executed using a processor, for instance processor 206 or the processor of the respective client terminal 202.

The method 100 and system 200 allow using user's behavioral data which is accumulated by the software and/or hardware modules of the client device 202 for dynamically generating one or more behavioral pattern(s) of the user and to identify deviation(s) from the behavioral pattern(s). A behavioral pattern may be updated continuously, iteratively, periodically and/or upon demand. The behavioral data may include behavioral data selected from one or more of the following examples:

locational data of the location and/or movement of the user during a pre-monitoring period, for example data gathered from a GPS module and/or a cellular location service;

browsing data indicative of web content visited by the user during a pre-monitoring period, for instance webpages, websites, video files, audio file presentations, documents and/or the like, for instance data acquired from a log or a history file;

media content viewed by the user during a monitoring period, for instance television shows, news and/or the like, for instance data acquired from a log or a usage history file;

application usage device indicative of application used by the user during a pre-monitoring period, for example data acquired from an event log that documents application activity;

a call history indicative of calls made by or with the user during a pre-monitoring period, for example data acquired from a call manager or log;

a messaging history indicative of instant messaging content and/or participants made during a pre-monitoring period, for example data acquired from an IM module;

email history indicative of content of electronic messages (emails) and/or recipients and/or senders of emails sent and/or received during a pre-monitoring period, for instance data acquired from an email editor; and media capturing data indicative of content of images, video files and/or audio files captured using the client device during a monitoring period and/or data that is based on the content of the media capturing data (e.g. who is in the pictures and/or where pictures have been taken).

Optionally, the security question is set to be presented using a user interface, such as a graphical user interface every period, for instance every 10 minutes, every hour, every 12 hours, every 24 hours and/or every longer or intermediate period and replaced only when fulfilled. The security question may be presented to unlock periodical locking of the client device 202 as a whole or any resource accessible therewith. The security question may be presented instead of an existing password requirement, used where no password is required, and/or used in addition to an existing password requirement.

Additionally or alternatively, the monitoring period is set to one or more hours and/or days before the security question is presented to the user. In such a manner, when the user loses the client device, data accumulated during the monitoring period reflects data gathered at least partly before the user lost the client device. For example, the data is extracted from monitoring period held a day or two before the security question is generated. In such a manner, the security question is based on data gathered few day(s) or hour(s) in advance, probably before the user lost control on the client device.

The security question may be selected from a set of predefined questions associated with the monitored data and period and fit the answer which includes the deviation and/or indicative of the deviation. The answer(s) and/or question(s) may be generated using semantic engines, templates, statistical analysis and/or the like. For example, when the data is locational data the question may be: "where have you been yesterday?" or "where have you been yesterday between XXAM and YYPM?" where XX and YY are time spots. In another example, where the data is browsing data, the question may be: "which website/website type did you visit and/or what was the title of an article you read yesterday morning?". In another example, where the data is application usage, the question may be: "which application was installed and/or used a few hours ago?". In another example, where the data include call history, the question may be: "who did you spoke with yesterday?". In another example, where the data includes a messaging and/or email history, the question may be: "who did you receive an IM and/or email from today?". In another example, where the data is media capturing data, the question may be: "a picture of whom did you take yesterday and/or where did you take a picture yesterday?".

As shown at 101, a behavioral pattern indicative of repetitive behavior of a user is provided, for example calculated as described herein and/or accessed when stored in a database such as 203. The behavioral pattern is optionally calculated from behavioral data accumulated before the monitoring period, during a pre monitoring period, for instance using the monitoring module 201. The behavioral pattern may be statistically calculated, for instance by using data accumulated before the monitoring period, during a pre-monitoring period, as a training set for creating a model or a classifier for identifying deviation(s). The pre-monitoring period may be a period of few days, a week, a month, a year, or any longer or intermediate period before the monitoring period. The behavioral pattern may be locally stored in the memory 203 or remotely stored in the central unit 204. The behavioral pattern may be calculated by a third party. Examples for a behavioral pattern may be route(s) a user takes daily (e.g. during a working day), web content routinely browsed daily (e.g. during a working day), contacts dialed daily (e.g. during a working day), persons photographed in most pictures, applications used frequently, frequent email recipients, and/or the like.

As shown at 105, the behavioral pattern is repetitively updated and/or generated to reflect a current routine of the user.

As shown at 102, a behavior of the user during a monitoring period is monitored to identify automatically a deviation from the most up to date behavioral pattern. For example, the deviation may be:

unroutinely driving in a new route and/or to a new location unroutinely visiting and optionally actively browsing a webpage for a period of more than a certain threshold, for instance more than 5 minute;

unroutinely talking with a caller and/or a callee, optionally for a period of more than a certain threshold, for instance more than 5 minute, unroutinely sending or receiving a message from a sender and/or addressee, and optionally actively corresponding with the sender and/or the addressee, for instance sending and/or receiving at least 3 messages and/or the like, unroutinely using an application; and unroutinely taking a picture or a video in a certain location and/or taking more than a certain amount of picture in the certain location and/or the like.

As used herein, unroutinely is used to describe an action held less than a certain amount of times and/or less than a certain percentage of the cases during the pre monitoring period.

Now, as shown at 103, a security question requiring the deviation or an indication thereof as an answer and the answer are automatically generated. The question may be generated as an outcome or a request from a resource, such as a service, an application, a website, a webpage, and/or a file manager wherein an authentication is required before access is granted. For example, the security question may be generated at the central unit 204 and/or in a module installed on a monitored client terminal in response to a request from a resource which receives an access request from a user. The generated question is forwarded to the resource. The question may be generated from a set of template questions, for example as described above. The question may be generated by semantic engine which identify a question structure to a define answer where the define answer is the deviation.

Optionally, the security question is a request from a user to mark an area or a region in a map, indicating a location he or she visited during the monitoring period.

Optionally, the security question is a request from a user to select the right answer out of a number of answers including an answer generated based on the deviation and a number of decoy answers, optionally selected from an analysis of the pre monitoring data and/or from the behavioral pattern.

Optionally, the security question is a request to provide an open answer later matched with the deviation, for instance using a semantic engine.

As shown at 104, the security question is used to authenticate an access to a content associated with the user after the monitoring period. For example, the security question is presented to a user who is interested to access application(s) installed in the client device 202, operate the client device 202, access file encrypted and secured using an encryption function an answer to the security question and/or the like.

Optionally, the security question is embedded into a security script loaded when an access to content or service is requested. The security script includes a reference, for instance a link and/or a call function which retrieves the security question, for instance from a central unit 204 and/or the security question generation module 205. In such embodiments, the security question may be generated upon request from the security script. The security script may be executed by a decoder decoding content and/or by an access manager of a service and/or an application.

According to some embodiments of the present invention, the security question is used as a backup for an existing password. According to some embodiments of the present invention, the security question is used instead of a password.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a module, a network, a semantic engine, and a unit is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of processing user behavior data monitored at a client terminal for instructing a user interface presented on a display of said client terminal
   to present a security question for accessing a resource, comprising:
   accumulating behavioral data of a user of said client terminal during a pre-monitoring period, said behavioral data is recorded using a monitoring module executed centrally or on said client terminal and delivered to at least one server over a communication network;
   using at least one hardware processor of said at least one server for analyzing at least some of said behavioral data to calculate statistically a behavioral pattern indicative of a repetitive behavior of said user;
   accumulating additional behavioral data of said user during a monitoring period that proceeds said pre-monitoring period, said additional behavioral data is recorded using said monitoring module and delivered to said at least one server over said communication network;
   using said at least one hardware processor for analyzing at least some of said additional behavioral data to identify automatically a deviation from said behavioral pattern;
   automatically generating said security question, wherein a right answer to said security question is an indication of said deviation;
   instructing a presentation of said security question by said user interface on the display of said client terminal for authenticating an access to the resource when said indication is identified in user input;
   wherein said behavioral pattern is calculated by gathering media content viewed by the user during said pre-monitoring period, said deviation is at least one of viewing additional media content at a respective time during said monitoring period and not viewing a routinely viewed content at the respective time during said monitoring period.

2. The method of claim 1, wherein said pre-monitoring period is a period of at least one day.

3. The method of claim 1, wherein said behavioral data is used as a training set for creating a classifier, said deviation is identified using said classifier.

4. The method of claim 1, further comprising forwarding said security question to said resource.

5. The method of claim 1, wherein said behavioral pattern is calculated by gathering locational data logging at least one of a route, a location and a movement of the user during said pre-monitoring period that precedes said monitoring period, said deviation is a deviation from at least one of said route, said location and said movement at the respective time during said monitoring period.

6. The method of claim 1, wherein said monitoring period is at least 1 hour.

7. The method of claim 1, wherein said resource is a file and said security question is embedded into a security script loaded when an access to said file is requested.

8. The method of claim 1, wherein said resource is an application installed in said client terminal and said security question is presented when an access to said application is requested.

9. A method of processing user behavior data monitored at a client terminal for instructing a user interface presented on a display of said client terminal to present a security question for accessing a resource, comprising:
   accumulating behavioral data of a user of said client terminal during a pre-monitoring period, said behavioral data is recorded using a monitoring module executed centrally or on said client terminal and delivered to at least one server over a communication network;
   using at least one hardware processor of said at least one server for analyzing at least some of said behavioral data to calculate statistically a behavioral pattern indicative of a repetitive behavior of said user;
   accumulating additional behavioral data of said user during a monitoring period that proceeds said pre-monitoring period, said additional behavioral data is recorded using said monitoring module and delivered to said at least one server over said communication network;
   using said at least one hardware processor for analyzing at least some of said additional behavioral data to identify automatically a deviation from said behavioral pattern;
   automatically generating said security question, wherein a right answer to said security question is an indication of said deviation;
   instructing a presentation of said security question by said user interface on the display of said client terminal for authenticating an access to the resource when said indication is identified in user input;
   wherein said behavioral pattern is calculated by gathering browsing data documenting access of said user to a set of a plurality of web documents during said pre-monitoring period that precedes said monitoring period, said deviation is at least one of an access to an additional web document that is not in said set at a respective time during said monitoring period and lack of access to at least one of said plurality of web documents at the respective time during said monitoring period.

10. A method of processing user behavior data monitored at a client terminal for instructing a user interface presented on a display of said client terminal to present a security question for accessing a resource, comprising:
    accumulating behavioral data of a user of said client terminal during a pre-monitoring period, said behavioral data is recorded using a monitoring module executed centrally or on said client terminal and delivered to at least one server over a communication network;
    using at least one hardware processor of said at least one server for analyzing at least some of said behavioral data to calculate statistically a behavioral pattern indicative of a repetitive behavior of said user;

accumulating additional behavioral data of said user during a monitoring period that proceeds said pre-monitoring period, said additional behavioral data is recorded using said monitoring module and delivered to said at least one server over said communication network;

using said at least one hardware processor for analyzing at least some of said additional behavioral data to identify automatically a deviation from said behavioral pattern;

automatically generating said security question, wherein a right answer to said security question is an indication of said deviation;

instructing a presentation of said security question by said user interface on the display of said client terminal for authenticating an access to the resource when said indication is identified in user input;

wherein said behavioral pattern is an application usage pattern calculated by gathering application usage data from a set of a plurality of applications installed in said client terminal used by said user during said pre-monitoring period that precedes said monitoring period, said deviation is at least one of using an additional application that is not in said set at a respective time during said monitoring period and lack of usage of at least one of said plurality of applications at the respective time during said monitoring period.

11. A method of processing user behavior data monitored at a client terminal for instructing a user interface presented on a display of said client terminal to present a security question for accessing a resource, comprising:

accumulating behavioral data of a user of said client terminal during a pre-monitoring period, said behavioral data is recorded using a monitoring module executed centrally or on said client terminal and delivered to at least one server over a communication network;

using at least one hardware processor of said at least one server for analyzing at least some of said behavioral data to calculate statistically a behavioral pattern indicative of a repetitive behavior of said user;

accumulating additional behavioral data of said user during a monitoring period that proceeds said pre-monitoring period, said additional behavioral data is recorded using said monitoring module and delivered to said at least one server over said communication network;

using said at least one hardware processor for analyzing at least some of said additional behavioral data to identify automatically a deviation from said behavioral pattern;

automatically generating said security question, wherein a right answer to said security question is an indication of said deviation;

instructing a presentation of said security question by said user interface on the display of said client terminal for authenticating an access to the resource when said indication is identified in user input;

wherein said behavioral pattern is a communication pattern calculated by gathering communication data documenting a set of a plurality of communication sessions held using said client terminal of said user during said pre-monitoring period that precedes said monitoring period, said deviation is at least one of communicating with at least one new contact, not communicating with a routinely contacted contact during said monitoring period, and changing an average time or frequency of a routinely performed communication session during said monitoring period.

12. The method of claim 11, wherein said communication data comprises a call history indicative of calls made by or with the user during said pre-monitoring period.

13. The method of claim 11, wherein said communication data comprises a messaging history indicative of at least one instant messaging content and instant messaging participants made during said pre-monitoring period.

14. The method of claim 11, wherein said communication data comprises email history indicative of recipients or senders of emails sent or received during said pre-monitoring period.

15. A method of processing user behavior data monitored at a client terminal for instructing a user interface presented on a display of said client terminal to present a security question for accessing a resource, comprising:

accumulating behavioral data of a user of said client terminal during a pre-monitoring period, said behavioral data is recorded using a monitoring module executed centrally or on said client terminal and delivered to at least one server over a communication network;

using at least one hardware processor of said at least one server for analyzing at least some of said behavioral data to calculate statistically a behavioral pattern indicative of a repetitive behavior of said user;

accumulating additional behavioral data of said user during a monitoring period that proceeds said pre-monitoring period, said additional behavioral data is recorded using said monitoring module and delivered to said at least one server over said communication network;

using said at least one hardware processor for analyzing at least some of said additional behavioral data to identify automatically a deviation from said behavioral pattern;

automatically generating said security question, wherein a right answer to said security question is an indication of said deviation;

instructing a presentation of said security question by said user interface on the display of said client terminal for authenticating an access to the resource when said indication is identified in user input;

wherein said behavioral pattern is a communication pattern calculated by gathering email data documenting a set of a plurality of communication sessions held using said client terminal of said user during said pre-monitoring period that precedes said monitoring period, said deviation is detected by identifying content not documented in said plurality of communication sessions and viewed by said user using said client terminal.

16. A system of processing user behavior data monitored at a client terminal for instructing a presentation of a security question by a user interface presented on a display of said client terminal for accessing a resource, comprising:

a database which stores a behavioral pattern indicative of repetitive behavior of a user of said client terminal;

at least one hardware processor coupled to the database for executing code comprising:

code instructions for receiving behavioral data of said user, said behavioral data is accumulated during a pre-monitoring period, said behavioral data is recorded using a monitoring module executed centrally or on said client terminal and delivered to at least one server over a communication network;

code instructions for analyzing at least some of said behavioral data to calculate statistically said behavioral pattern;

code instructions for receiving additional behavioral data of said user, said additional behavioral data is accumulated during a monitoring period that proceeds said pre-monitoring period, said additional behavioral data is recorded using said monitoring module and delivered to said at least one server over said communication network;

code instructions for analyzing at least some of said additional behavioral data to identify automatically a deviation from said behavioral pattern;

code instructions for generating automatically said security question, wherein a right answer to said security question is an indication of said deviation;

code instructions for instructing the presentation of said security question by said user interface presented on the display of said client terminal for authenticating an access to the resource when said indication is identified in user input;

wherein said behavioral pattern is calculated by gathering media content viewed by the user during said pre-monitoring period, said deviation is at least one of viewing additional media content at a respective time during said monitoring period and not viewing a routinely viewed content at the respective time during said monitoring period.

* * * * *